(12) United States Patent
Fujita

(10) Patent No.: US 11,751,022 B2
(45) Date of Patent: Sep. 5, 2023

(54) COMMUNICATION DEVICE, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Shunji Fujita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 16/945,484

(22) Filed: Jul. 31, 2020

(65) Prior Publication Data
US 2020/0367031 A1 Nov. 19, 2020

Related U.S. Application Data

(63) Continuation of application No. PCT/JP2018/048505, filed on Dec. 28, 2018.

(30) Foreign Application Priority Data

Feb. 5, 2018 (JP) .................................. 2018-018519

(51) Int. Cl.
*H04W 4/23* (2018.01)
*H04N 21/4363* (2011.01)
(Continued)

(52) U.S. Cl.
CPC ............. *H04W 4/23* (2018.02); *H04L 5/0046* (2013.01); *H04L 5/0094* (2013.01); *H04N 21/43637* (2013.01); *H04W 4/80* (2018.02)

(58) Field of Classification Search
CPC ........ H04W 4/23; H04W 4/80; H04L 5/0094; H04L 5/0046; H04N 21/43637
See application file for complete search history.

(56) References Cited

U.S. PATENT DOCUMENTS 9,094,730 B1* 7/2015 Kirmse ............ H04N 21/41407
10,887,762 B2* 1/2021 Kwon ................... H04W 76/10
(Continued)

FOREIGN PATENT DOCUMENTS

JP 2016-046656 A 4/2016
JP 2016-076767 A 5/2016
(Continued)

OTHER PUBLICATIONS

Adachi Eiji, Large Study, From now on featured IoT Wireless, Interface, vol. 43, No. 11, CQ Publishing Co. Ltd, Nov. 1, 2017 (Partial Translation), Cited in ISR.
(Continued)

*Primary Examiner* — Pinkal R Chokshi
(74) *Attorney, Agent, or Firm* — Cowan, Liebowitz & Latman, P.C.

(57) ABSTRACT

The present invention, when it is estimated that a device that can receive a large-sized advertisement is present within a communication area, transmits advertisement packets of that size. A communication device of this invention comprises a first transmission unit that transmits a first advertisement packet, using a first frequency band, a determination unit that, upon receiving a request packet in response to the first advertisement packet, determines whether or not an external device that can receive the second advertisement packet whose size is larger than that of the first advertisement packet is present within a communication area, based on the request packet, and a second transmission unit that, if the determination result indicates the presence, transmits a second advertisement packet, using a second frequency band different from the first frequency band.

14 Claims, 11 Drawing Sheets

(51) Int. Cl.
　　　*H04W 4/80*　　　(2018.01)
　　　*H04L 5/00*　　　(2006.01)

(56)　　　　　　References Cited

U.S. PATENT DOCUMENTS

| | | | |
|---|---|---|---|
| 2015/0350820 A1* | 12/2015 | Son .................. | H04W 12/08 |
| | | | 455/41.2 |
| 2016/0057695 A1* | 2/2016 | Tomida .................. | H04L 67/51 |
| | | | 370/328 |
| 2016/0183077 A1* | 6/2016 | Wang .................. | H04W 4/80 |
| | | | 455/41.2 |
| 2017/0018002 A1* | 1/2017 | Champy ............ | G06Q 30/0257 |
| 2017/0295599 A1* | 10/2017 | Mohaupt ............... | H04W 8/005 |
| 2017/0303070 A1* | 10/2017 | Batra .................. | H04L 1/00 |
| 2018/0014341 A1* | 1/2018 | Jung .................. | H04W 56/002 |
| 2018/0017946 A1* | 1/2018 | Kyou .................. | H04W 4/80 |
| 2018/0270311 A1* | 9/2018 | Baker ................. | H04L 63/102 |
| 2018/0359627 A1* | 12/2018 | Ko .................. | H04L 67/303 |
| 2019/0150215 A1* | 5/2019 | Li .......................... | H04W 4/80 |
| | | | 370/329 |
| 2019/0230408 A1* | 7/2019 | Borghei ................. | H04L 67/02 |
| 2020/0137543 A1* | 4/2020 | Kobayashi ............. | H04B 1/385 |

FOREIGN PATENT DOCUMENTS

| | | |
|---|---|---|
| JP | 2016-149721 A | 8/2016 |
| JP | 2017-092645 A | 5/2017 |

OTHER PUBLICATIONS

The above foreign patent documents 1, 3, and NPL 1 were cited the International Search Report dated Feb. 5, 2019 of PCT/JP2018/ 048505 _ Dec. 28, 2018, which is enclosed.

The above foreign patent document was cited in the Mar. 28, 2022 Japanese Office Action, which is enclosed without an English Translation, that issued in Japanese Patent Application No. 2018- 018519.

* cited by examiner

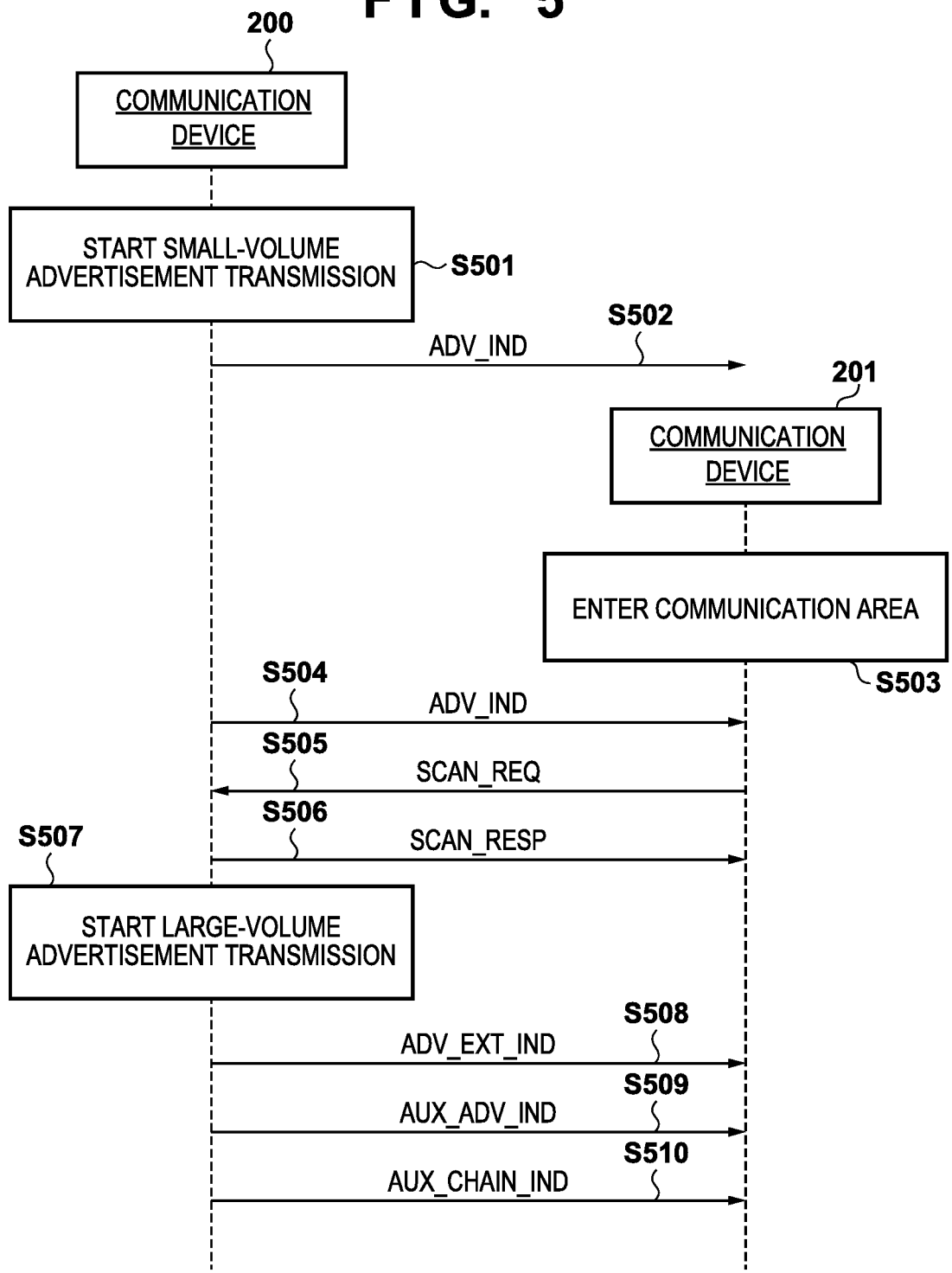

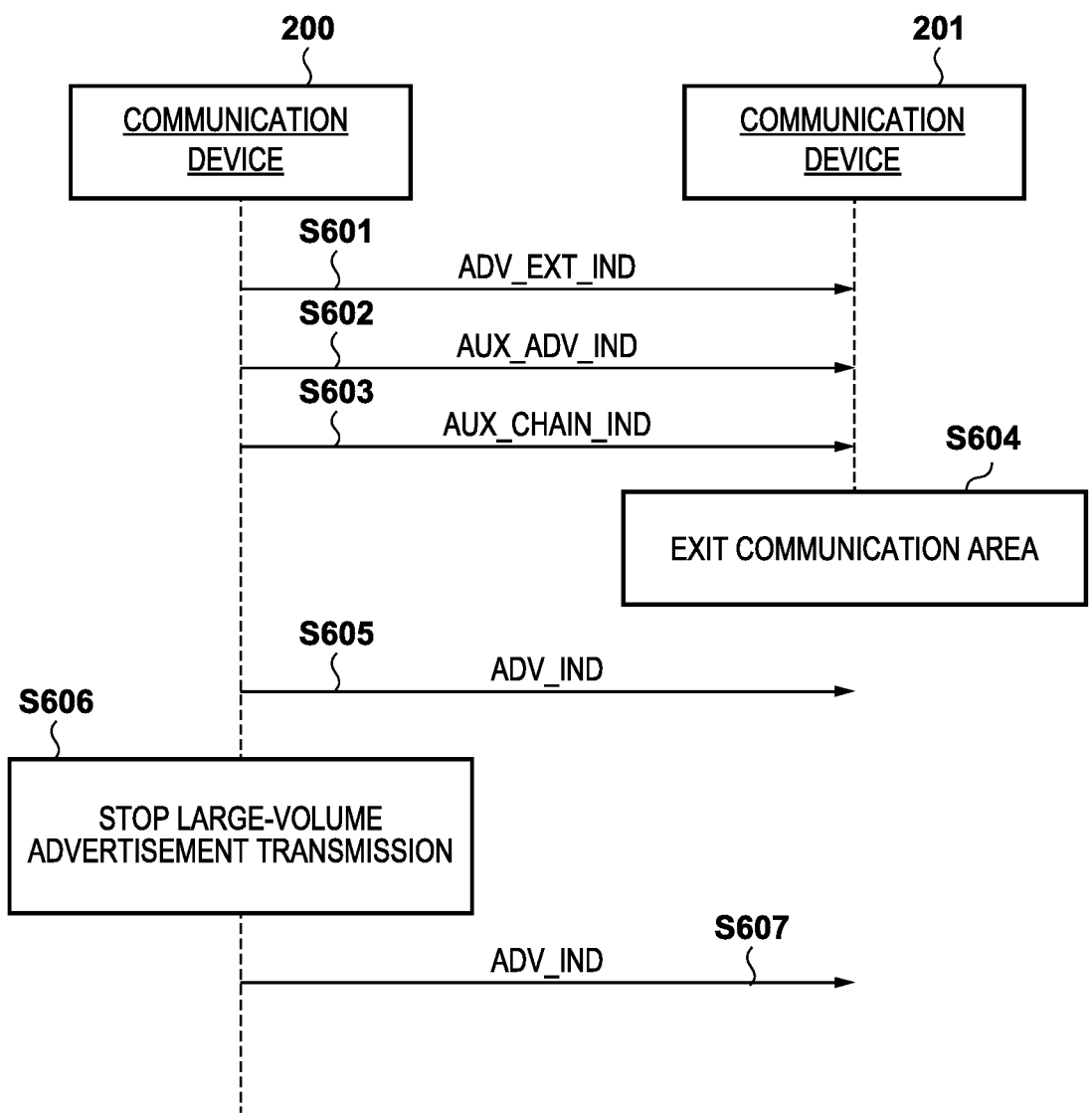

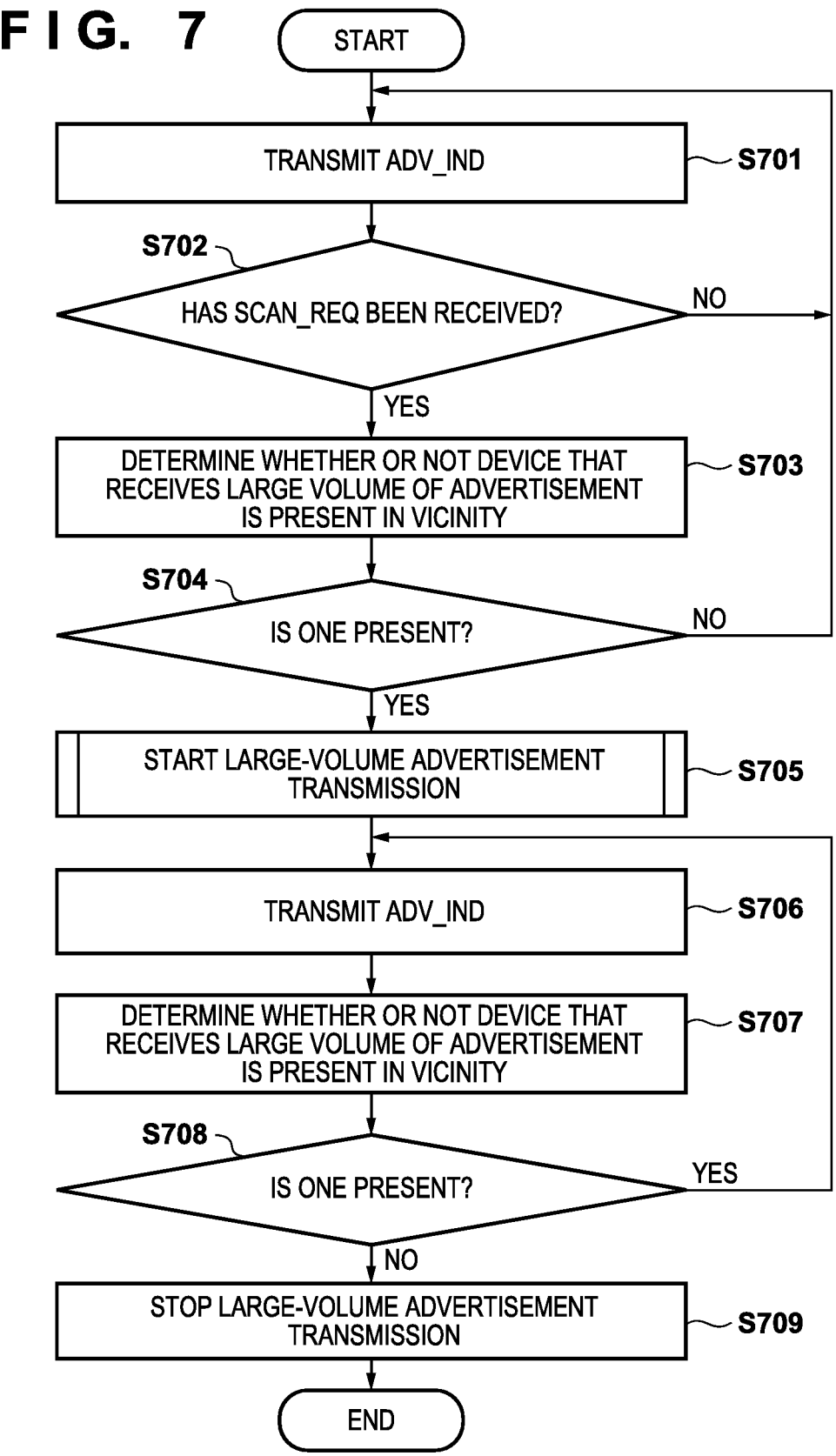

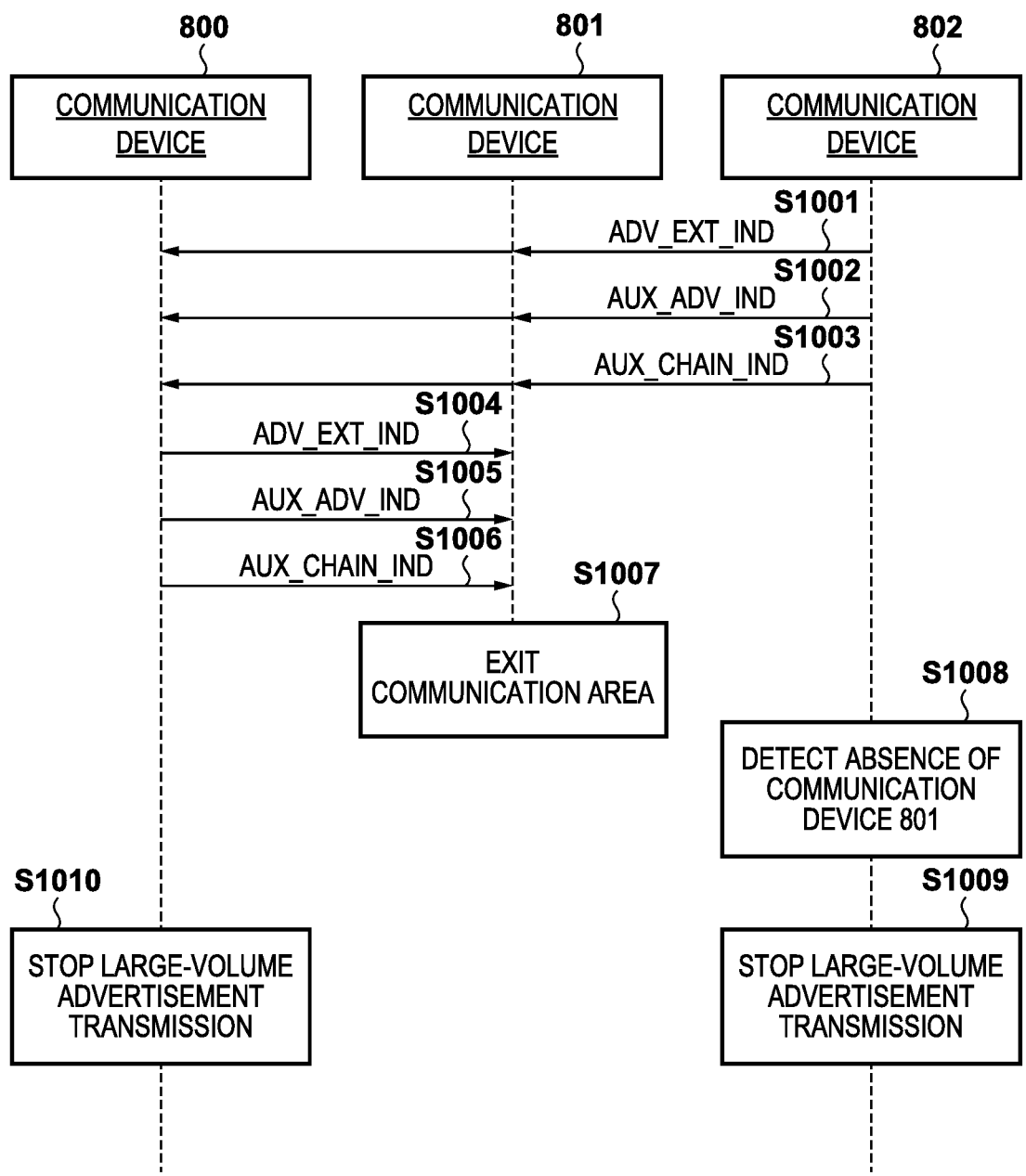

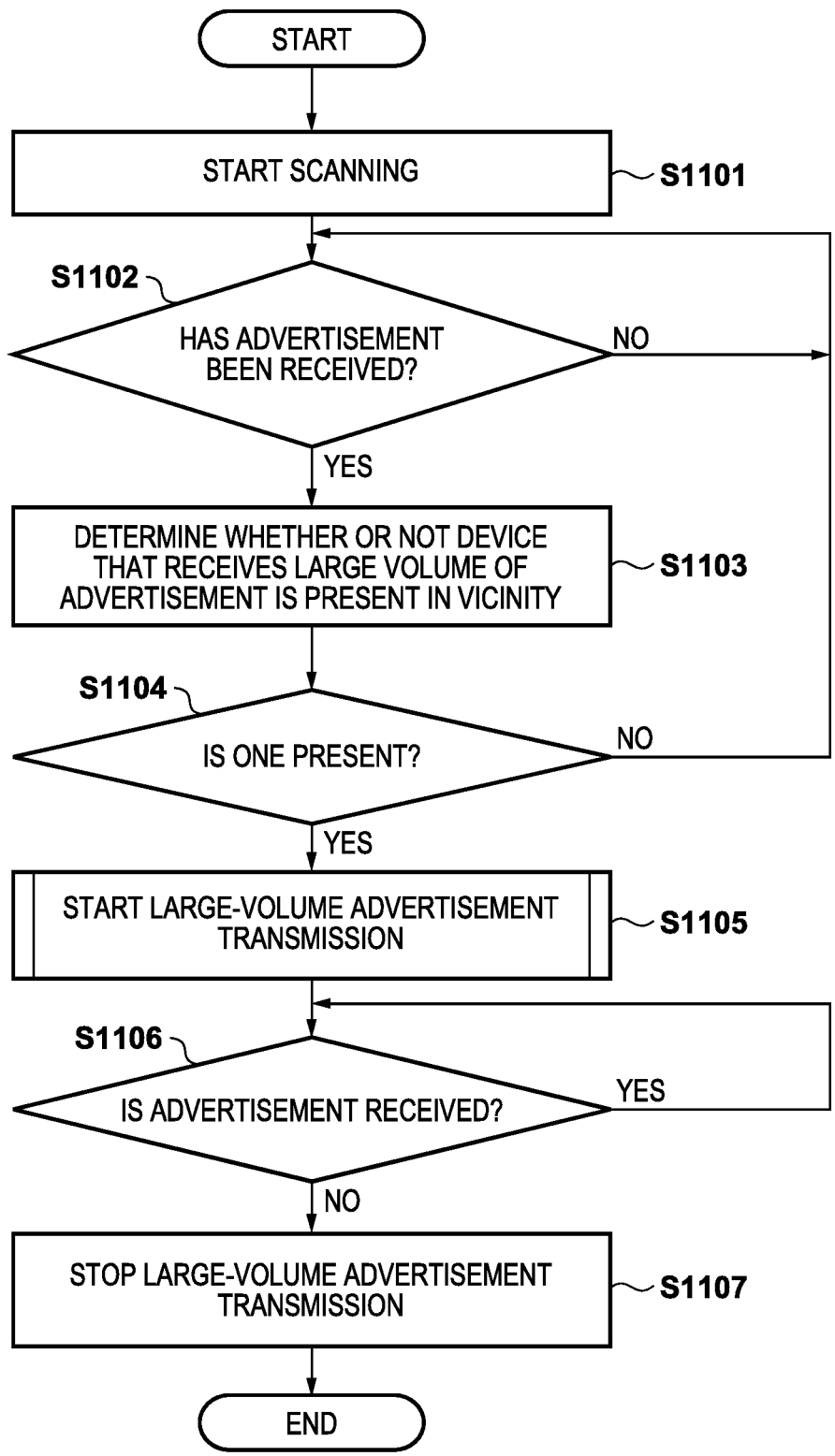

COMMUNICATION DEVICE, METHOD FOR CONTROLLING THE SAME, AND NON-TRANSITORY COMPUTER-READABLE STORAGE MEDIUM

CROSS-REFERENCE TO RELATED APPLICATIONS

This application is a Continuation of International Patent Application No. PCT/JP2018/048505, filed Dec. 28, 2018, which claims the benefit of Japanese Patent Application No. 2018-018519, filed Feb. 5, 2018, both of which are hereby incorporated by reference herein in their entirety.

BACKGROUND OF THE INVENTION

Field of the Invention

The present invention relates to a communication device, a method for controlling the same, and a non-transitory computer-readable storage medium.

Background Art

In recent years, an increasing number of devices have a function that complies with the ultra-low power consumption wireless communication standard defined as Bluetooth Low Energy (hereinafter referred to as BLE) in the Bluetooth (registered trademark) Core Specification Version 4.0. BLE is designed for long-term operation with a battery such as a button cell. According to BLE, a communication device that operates as an advertiser intermittently broadcasts advertisement packets to notify a communication device that operates as a scanner, of the identification information of the advertiser itself, information regarding services that the advertiser provides, and so on. PTL1 discloses a technique for transmitting information indicating a state in which an image processing apparatus can execute a job as advertisement packets, using the BLE technology.

Also, Bluetooth 5.0 (hereinafter referred to as BT5) with enhanced BLE specifications for IoT has recently been formulated. BT5 has a greatly expanded transmission bandwidth for advertisement packets, and a large volume of data can be transmitted. For example, the amount of data that can be include in advertisement packets is increased from the conventional amount, 31 bytes, to 255 bytes.

However, if the amount of data in the advertisement packets to be transmitted is increased, it may be impossible to realize ultra-low power consumption, which is an intrinsic advantage of BLE, because the power consumption required for transmission processing is increased. For example, transmitting advertisement packets in an environment where there is no receiving device in the vicinity means that power is wastefully consumed, and there is a problem in that the wasteful power consumption increases as the volume of data increases.

CITATION LIST

Patent Literature

PTL1: Japanese Patent Laid-Open No. 2016-149721

SUMMARY OF INVENTION

The present invention has been made in view of such a problem, and aims to provide a technique for, when it is estimated that a device that can receive a large-sized advertisement is present within a communication area, transmitting advertisement packets of that size, thereby transmitting advertisement packets of a desired size with a low power consumption.

According to an aspect of the present invention, there is provided a communication device comprising:
a first transmission unit configured to transmit a first advertisement signal, using a first frequency band; and
a second transmission unit configured to transmit a second advertisement signal that has a larger data size than the first advertisement signal, using a second frequency band that is different from the first frequency band, upon receiving a request signal that requests information regarding the communication device, in response to the first advertisement signal transmitted by the first transmission unit.

Further features of the present invention will become apparent from the following description of exemplary embodiments with reference to the attached drawings.

BRIEF DESCRIPTION OF DRAWINGS

FIG. 5 is a diagram showing an example of a sequence for starting large-volume advertisement transmission according to the first embodiment.

FIG. 6 is a diagram showing an example of a sequence for stopping large-volume advertisement transmission according to the first embodiment.

FIG. 7 is a diagram showing a flow of control of large-volume advertisement transmission according to the first embodiment.

FIG. 10 is a diagram showing an example of a sequence for stopping large-volume advertisement transmission according to the second embodiment.

FIG. 11 is a diagram showing a flow of control of large-volume advertisement transmission according to the second embodiment.

DESCRIPTION OF EMBODIMENTS

The following describes embodiments according to the present invention in detail with reference to the accompanying drawings.

First Embodiment

Internal Configuration of Communication Device

Figure 1:
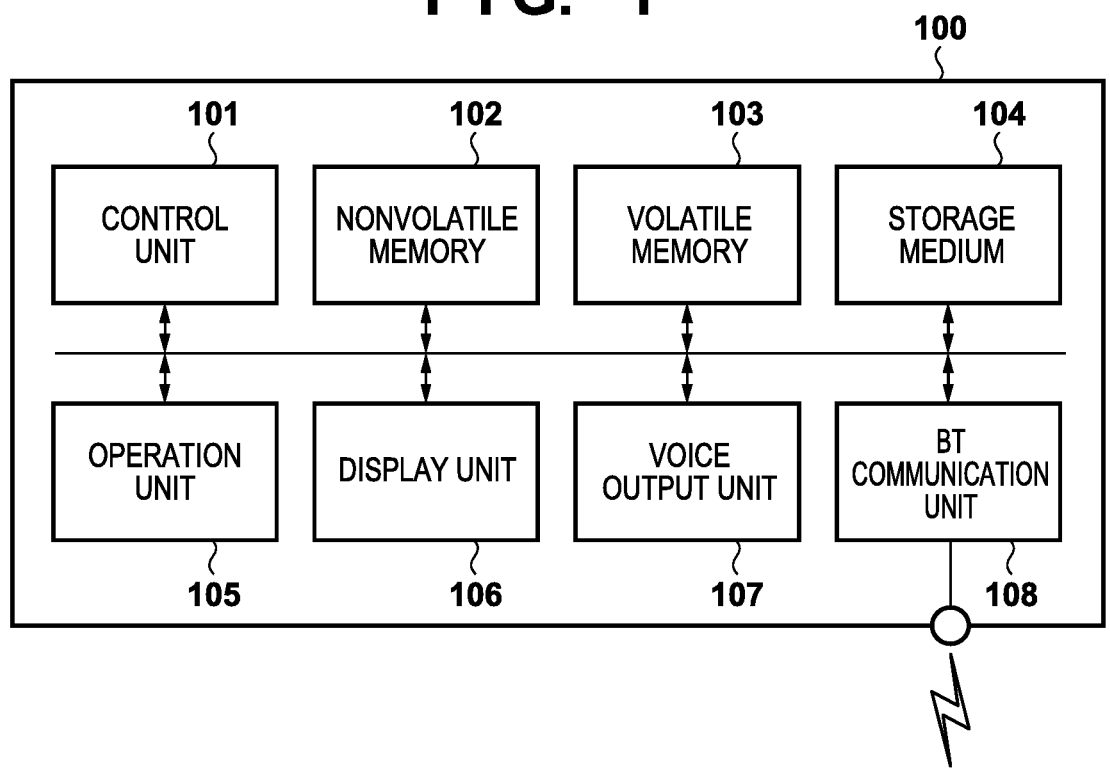
FIG. 1 is a diagram showing an internal configuration of a communication device.

FIG. 1 is a diagram showing an example of an internal configuration of a communication device 100 according to the present embodiment. The communication device 100 includes a control unit 101, a nonvolatile memory 102, a volatile memory 103, a storage medium 104, an operation unit 105, a display unit 106, a voice output unit 107, and a BT communication unit 108.

The control unit 101 controls the entire processing block by executing a control program stored in the nonvolatile memory 102. The control unit 101 is constituted by one or more processors such as CPUs or MPUs.

The nonvolatile memory 102 stores the control program to be executed by the control unit 101 and various kinds of data, and is typically a ROM. The volatile memory 103 stores the control program to be executed by the control unit 101, is used as a work memory, and is typically a RAM. The storage medium 104 is used as an area for storing data to be transferred by the BT communication unit 108, parameters related to the transfer, and so on. The storage medium 104 is constituted by, for example, a large-capacity flash memory, memory card, or the like.

The operation unit 105 accepts a user operation, and controls processing performed to transmit the input information to the control unit 101. The operation unit 105 is constituted by a touch panel, a button switch, a directional pad, and so on. The display unit 106 performs control to display characters and images in order to notify the user of information. The display unit 106 is constituted by a liquid crystal panel, an LED, and so on. The voice output unit 107 performs control to output a voice in order to notify the user of information. The voice output unit 107 is constituted by a speaker or the like. The BT communication unit 108 is a processing unit that controls BLE communication conforming to the Bluetooth (registered trademark) standards.

The communication device 100 according to the present embodiment is widely applicable to products that are provided with a BLE communication function. For example, the communication device 100 is applicable to a smartphone, a tablet, a digital camera, headphones, a PC (Personal Computer), an automobile, and so on.

System Configuration

Figure 2:
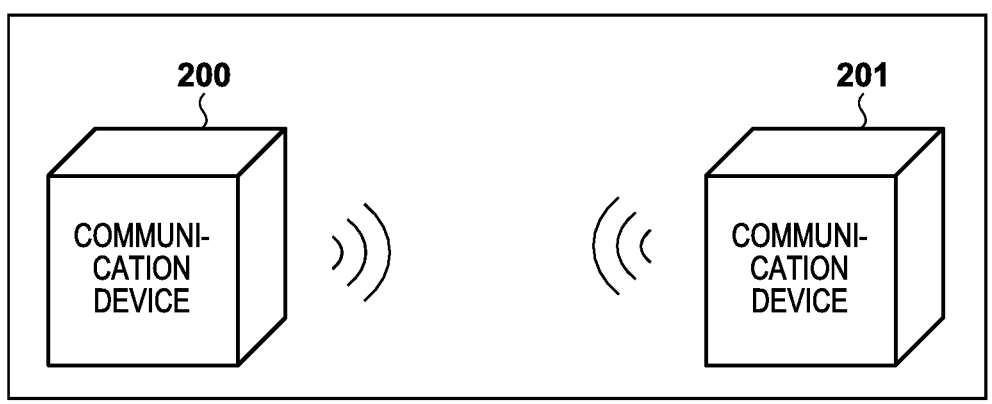
FIG. 2 is a diagram showing a system configuration according to a first embodiment.

FIG. 2 is a diagram showing a system configuration according to the present embodiment. In FIG. 2, a communication device 200 and a communication device 201 are both provided with the internal configuration shown in FIG. 1. The communication device 200 operates as a BLE advertiser, and the communication device 201 functions as a communication partner (scanner) of the communication device 200.

Advertisement Packet Transmission

Figure 3A:
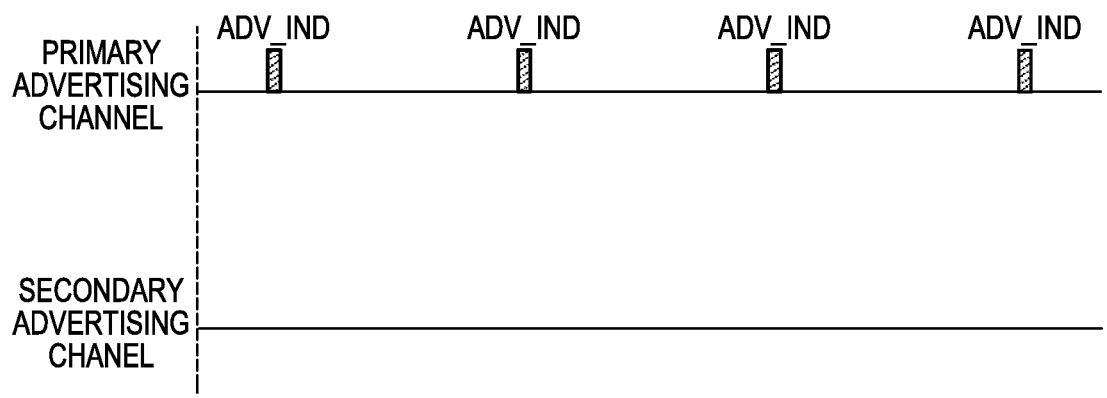
FIG. 3A is a diagram showing an example of advertisement transmission performed by the communication device.
Figure 3B:
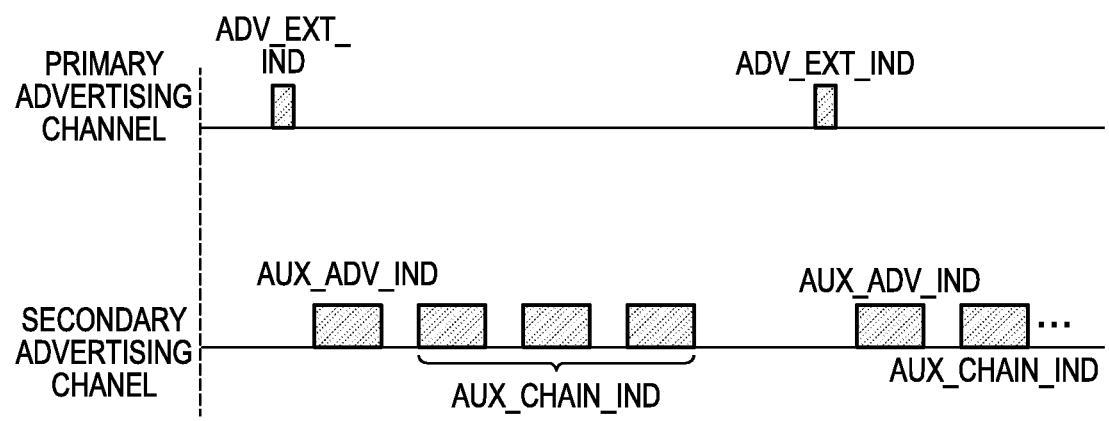
FIG. 3B is a diagram showing an example of advertisement transmission performed by the communication device.

FIGS. 3A and 3B are diagrams illustrating an example of advertisement transmission performed by the communication device 200. The communication device 200 can perform advertisement transmission defined in the BT5 standard.

As shown in FIGS. 3A and 3B, according to the BT5 standard, two types of channels (frequency bands) are used to perform advertisement transmission. The channels of one type are called primary advertising channels, and channel IDs 37 (2402 MHz), 38 (2426 MHz), and 39 (2480 MHz) defined in the BT5 standard are used. Note that the center frequency of the channel is shown in parentheses. The channels of the other type are called secondary advertising channels, and channel IDs 1 (2404 MHz) to 11 (2424 MHz) and 13 (2428 MHz) to 38 (2479 MHz) are used. The secondary advertising channels employ a wider frequency range than the primary advertising channels, and are also used as data communication channels after BLT communication connection has been established.

FIG. 3A is a diagram showing advertisement transmission through which a small volume of application data is transmitted. In small-volume advertisement transmission, ADV_IND is transmitted at predetermined time intervals, only using the primary advertising channels. ADV_IND is one of the advertising channel PDUs defined in the BT5 standard, and the communication device 200 can include up to 31 bytes of application data in ADV_IND. A time interval for transmitting ADV_IND is within the range from 20 milliseconds to 10.24 seconds.

Figure 4A:
FIG. 4A is a diagram showing a format of an advertising channel PDU.
Figure 4B:
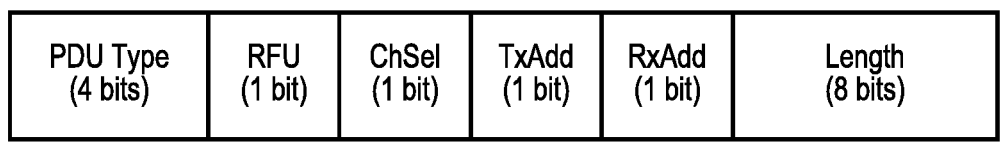
FIG. 4B is a diagram showing a format of an advertising channel PDU.
Figure 4C:
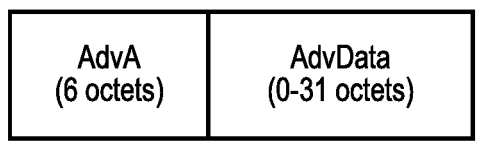
FIG. 4C is a diagram showing a format of an advertising channel PDU.

Here, the format of ADV_IND will be described. FIG. 4A shows a common format of advertising channel PDUs. An advertisement packet is constituted by a header and a payload. FIG. 4B shows the details of the header. PDU Type is a parameter for identifying the type of the advertisement packet. For example, 0000b ("b" means binary) indicates that the advertisement packet is ADV_IND. The other parameters in the header are not directly related to the spirit of the present invention, and therefore descriptions thereof are omitted. FIG. 4C shows the details of the payload of ADV_IND. The payload is constituted by AdvA and AdvData. AdvA is a device address of the device that transmits the advertisement packet. A device address is information for uniquely identifying a device. AdvData is given information data that can be set from a host application. The maximum size of AdvData varies depending on PDU Type, and is 31 bytes in the case of ADV_IND. The communication device 200 stores identification information of a service that the communication device 200 provides, a device name, a manufacturer information, and so on in AdvData.

FIG. 3B is a diagram showing advertisement transmission through which a large volume of application data is transmitted. In large-volume advertisement transmission, a plurality of types of advertisement packets are transmitted, mainly using the secondary advertising channels. Each of the advertisement packets shown in FIG. 3B is one of the advertising channel PDUs defined in the BT5 standard.

Figure 4D:
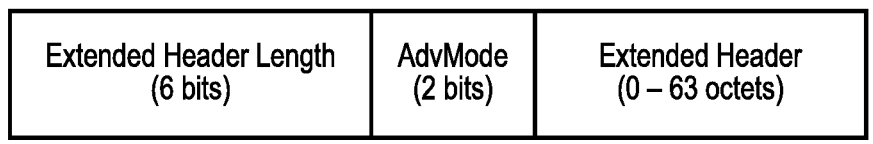
FIG. 4D is a diagram showing a format of an advertising channel PDU.

When a large volume of advertisement (an advertisement of a target size) is to be transmitted, the communication device 200 first transmits ADV_EXT_IND, using the primary advertising channels. The communication device 200 includes, in ADV_EXT_IND, information required for the reception of AUX_ADV_IND that is to be subsequently transmitted. FIG. 4D shows the details of the payload of ADV_EXT_IND. The communication device 200 includes, in Extended Header, a channel ID that is used to transmit AUX_ADV_IND, and information regarding transmission timing. Here, information regarding transmission timing is information indicating a time interval for ADV_EXT_IND and AUX_ADV_IND. The communication device 200 sets the time interval in units of 30 microseconds or 300 microseconds, which is shorter than the aforementioned time interval for ADV_IND.

Subsequently, the communication device 200 transmits AUX_ADV_IND, using the secondary advertising channels. The communication device 200 includes, in this AUX_AD- V_IND, information required for the reception of AUX_CHAIN_IND that is to be subsequently transmitted, and AdvData.

Subsequently, the communication device 200 transmits AUX_CHAIN_IND, using the secondary advertising channels. The communication device 200 includes, in AUX_CHAIN_IND, information required for the reception of AUX_CHAIN_IND that is to be subsequently transmitted, and AdvData. The communication device 200 transmits AUX_CHAIN_IND multiple times in order to transmit application data. The communication device 200 includes, in the last AUX_CHAIN_IND, information indicating that the AUX_CHAIN_IND is at the end.

Figure 4E:
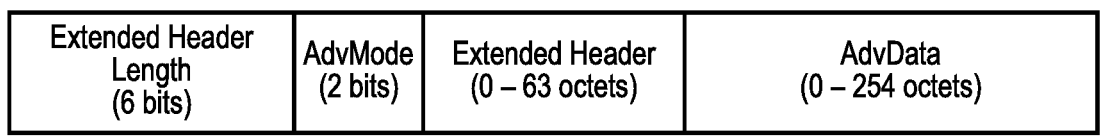
FIG. 4E is a diagram showing a format of an advertising channel PDU.

FIG. 4E shows the details of the payload of AUX_ADV_IND and AUX_CHAIN_IND. Extended Header includes the channel ID used to transmit AUX_CHAIN_IND, and information regarding transmission timing. In the case of AUX_CHAIN_IND, information indicating whether or not the AUX_CHAIN_IND is at the end is included therein.

AdvData is application data, and its maximum size is 254 bytes, which is larger than that in ADV_IND. The communication device 200 stores text data, voice data, image data, and so on in AdvData.

As described above, the communication device 200 can transmit a large volume of application data, using a series of advertisement packets from ADV_EXT_IND to AUX_CHAIN_IND.

The two types of advertisement transmission that can be performed by the communication device 200 have been described above with reference to FIGS. 3A and 3B.

Sequence for Starting Large-Volume Advertisement Transmission

Next, an example of a sequence for starting large-volume advertisement transmission performed by the communication device 200 will be described with reference to FIG. 5.

Before starting this sequence, the communication device 200 has not started small-volume advertisement transmission or large-volume advertisement transmission.

In S501, the communication device 200 starts small-volume advertisement transmission. The transmission may be started upon the communication device 200 being powered ON, or upon a user operation being performed using the operation unit 105 after the communication device 200 has been powered ON, for example.

In S502, the communication device 200 transmits ADV_IND using the primary advertising channels. ADV_IND is repeatedly transmitted at predetermined time intervals.

In S503, the communication device 201 enters the BLE communication area of the communication device 200. This step occurs if the user carries and moves either one of the communication devices, a moving body such as an automobile equipped with the communication device travels, or the BLE communication function of the communication device 201 is enabled in the communication area of the communication device 200, for example.

In S504, the communication device 200 transmits ADV_IND. The ADV_IND in this step is one of the ADV_INDs that have been repeatedly transmitted since S502.

Figure 4F:
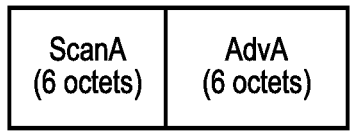
FIG. 4F is a diagram showing a format of an advertising channel PDU.

In S505, the communication device 201 transmits SCAN_REQ to the communication device 200 in response to the ADV_IND in S504. As a result of this step, the communication device 200 can determine that a scanner is present near the communication device 200. SCAN_REQ is one of the advertising channel PDUs defined in the BT5 standard, and is mainly used to request detailed information from the advertiser. FIG. 4F shows the details of the format of SCAN_REQ. ScanA is the device address of the scanner, and is the device address of the communication device 201 in this step. AdvA is the device address of the advertiser, and is the device address of the communication device 200 in this step.

Figure 4G:
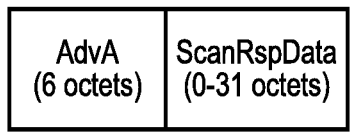
FIG. 4G is a diagram showing a format of an advertising channel PDU.

In S506, the communication device 200 transmits SCAN_RESP to the communication device 201 in response to the SCAN_REQ in S505. SCAN_RESP is one of the advertising channel PDUs defined in the BT5 standard, and is used to transmit a massage in response to SCAN_REQ. FIG. 4G shows the details of the format of SCAN_RESP. AdvA is the device address of the advertiser, and is the device address of the communication device 200 in this step. ScanRspData is an area in which given information data is stored.

In S507, upon detecting the presence of a scanner near the communication device 200, the communication device 200 starts large-volume advertisement transmission using the secondary advertising channels.

First, in S508, the communication device 200 transmits ADV_EXT_IND using the primary advertising channels, and the communication device 201 receives this ADV_EXT_IND.

In S509, the communication device 200 transmits AUX_ADV_IND using the secondary advertising channels, and the communication device 201 receives this AUX_ADV_IND.

In S510, the communication device 200 transmits AUX_CHAIN_IND using the secondary advertising channels, and the communication device 201 receives this AUX_CHAIN_IND.

S508, S509, and S510 correspond to the large-volume advertisement transmission processing shown in FIG. 3B, which is repeatedly performed at predetermined time intervals.

This concludes a description with reference to FIG. 5 of an example of a sequence for starting large-volume advertisement transmission performed by the communication device 200.

Sequence for Stopping Large-Volume Advertisement Transmission

Next, an example of a sequence for stopping large-volume advertisement transmission performed by the communication device 200 will be described with reference to FIG. 6.

Before starting this sequence, the communication device 200 has been performing the sequence for starting large-volume advertisement transmission shown in FIG. 5, and has been repeating both small-volume advertisement transmission and large-volume advertisement transmission.

In S601, the communication device 200 transmits ADV_EXT_IND, and the communication device 201 receives the ADV_EXT_IND. In S602, the communication device 200 transmits AUX_ADV_IND, and the communication device 201 receives the AUX_ADV_IND. In step S603, the communication device 200 transmits AUX_CHAIN_IND, and the communication device 201 receives the AUX_CHAIN_IND.

The above-described S601, S602, and S603 correspond to the large-volume advertisement transmission processing shown in FIG. 3B, which is repeatedly performed at predetermined time intervals.

In S604, the communication device 201 exits the BLE communication area of the communication device 200. This step occurs if the user moves either one of the communication devices, a moving body such as an automobile equipped with the communication device travels, or the BLE communication function of the communication device 201 is disabled in the communication area of the communication device 200, for example.

In S605, the communication device 200 transmits ADV_IND. The ADV_IND in this step is one of the ADV_INDs that have been repeatedly transmitted since S502.

In S606, the communication device 200 determines that no scanner is present near the communication device 200 as a result of not receiving SCAN_REQ in response to the ADV_IND transmitted in S605, and stops the large-volume advertisement transmission that have been repeatedly performed at predetermined time intervals.

In S607, the communication device 200 transmits ADV_IND. The ADV_IND in this step is one of the ADV_INDs that have been transmitted since S502.

This concludes a description with reference to FIG. 6 of an example of a sequence for stopping large-volume advertisement transmission performed by the communication device 200.

Flow of Control of Large-volume Advertisement Transmission by Communication Device 200

Next, a flow of control of the large-volume advertisement transmission performed by the communication device 200 will be described with reference to FIG. 7.

Before this flowchart is started, the communication device 200 has been performing small-volume advertisement transmission at predetermined time intervals.

In S701, the control unit 101 of the communication device 200 controls the BT communication unit 108 to transmit ADV_IND using the primary advertising channels. This step is one of the ADV_IND transmission steps repeatedly performed at predetermined time intervals.

In step S702, the control unit 101 of the communication device 200 determines whether or not the communication device 200 has received a response to the ADV_IND transmitted in S701, i.e. SCAN_REQ transmitted by the scanner, within a predetermined period after transmitting the ADV_IND. Upon determining that the communication device 200 has received SCAN_REQ, the control unit 101 advances processing to S703, and otherwise returns processing to S701.

In S703, the control unit 101 of the communication device 200 determines whether or not a device that receives a large volume of advertisement is present in the BLE communication area of the communication device 200. Specifically, the control unit 101 analyzes the ScanA included in the SCAN_REQ received in S702, and determines whether or not the ScanA of 6 bytes includes information indicating that a large volume of advertisement can be received. This determination method is made applicable by forming the upper three bytes of ScanA from the manufacture ID and the lower three bytes from the serial number of the device, and assigning a specific manufacturer ID and a specific serial number to a device that can receive a large volume of advertisement. Therefore, a table for specifying devices that can receive a large amount of advertisement is provided in the storage medium 104 of the communication device 200.

In S704, if the result of determination in step S703 indicates that a device that can receive a large volume of advertisement is present, the control unit 101 of the communication device 200 advances processing to S705, and otherwise returns processing to S701.

In S705, the control unit 101 of the communication device 200 starts large-volume advertisement transmission. This step corresponds to the series of large-volume advertisement transmission started from S507 in FIG. 5, which includes the processing performed in S508, S509, S510, and so on.

In S706, the control unit 101 of the communication device 200 controls the BT communication unit 108 to transmit ADV_IND. This step is one of the ADV_IND transmission steps repeatedly performed at predetermined time intervals.

In S707, the control unit 101 of the communication device 200 determines whether or not a device that receives a large volume of advertisement is present in the BLE communication area of the communication device 200. The control unit 101 receives SCAN_REQ in response to the ADV_IND transmitted in S706, analyzes the ScanA included in the SCAN_REQ, and determines that such a device is present if the ScanA of 6 bytes includes information indicating that a large volume of advertisement can be received. On the other hand, if SCAN_REQ is not received in response to the ADV_IND transmitted in S706, or even if SCAN_REQ is received, if the ScanA does not include information indicating that a large volume of advertisement can be received, the control unit 101 determines that such a device is not present.

In S708, if the result of determination indicates that a device that receives a large volume of advertisement is present in the BLE communication area of the communication device 200, the control unit 101 of the communication device 200 returns processing to S706. If the result of determination indicates that a device that receives a large volume of advertisement is not present in the BLE communication area, the control unit 101 of the communication device 200 advances processing to S709. In S709 here, the control unit 101 of the communication device 200 stops large-volume advertisement transmission. This step corresponds to S606 in FIG. 6.

This concludes a description with reference to FIG. 7 of the flow of control of the large-volume advertisement transmission performed by the communication device 200.

Note that the sequence shown in FIG. 7 illustrates an example of an embodiment of the communication device, and may be variously modified without departing from the spirit of the embodiment.

For example, in S703, upon receiving SCAN_REQ in S702, the control unit 101 of the communication device 200 may determine that a device that receives a large-volume advertisement is present in the BLE communication area of the communication device 200 regardless of the content of the SCAN_REQ packet. Thus, it is possible to simplify determination processing.

Also, in S703, the control unit 101 of the communication device 200 may determine that a device that can receive a large volume of advertisement is present only when the ScanA included in the SCAN_REQ received in S702 includes information indicating that a large volume of advertisement can be received and the reception sensitivity is no less than a predetermined threshold value. In other words, even if the ScanA included in SCAN_REQ includes information indicating that a large volume of advertisement can be received, if the reception sensitivity is less than the predetermined threshold value, the control unit 101 may determine that a device that receives a large volume of advertisement is not present in the BLE communication area of the communication device 200. If the reception sensitivity is less than the predetermined threshold value, the distance between the communication device 200 and the communication device 201 is long, and it is possible that the user does not expect to receive a large volume of advertisement. The above configuration makes it possible to avoid consuming power through unnecessary advertisement transmission.

Note that, even if the control unit 101 determines that the response to the ADV_IND transmitted in S701, i.e. the SCAN_REQ transmitted by the scanner, has been received within a predetermined time from when the ADV_IND was transmitted, if the reception sensitivity regarding the SCAN_ REQ is less than the predetermined threshold value, the control unit 101 may determine that a device that receives a large volume of advertisement is not present in the BLE communication area of the communication device 200. Furthermore, in a case where another determination method is used, it is possible to avoid consuming power through unnecessary advertisement transmission by determining that a device that receives a large volume of advertisement is not present in the BLE communication area of the communication device 200 if the reception sensitivity regarding the SCAN_REQ is less than the predetermined threshold value.

As described above, by controlling advertisement transmission based on SCAN_REQ reception processing, it is possible to perform large-volume advertisement transmission only when a device that receives the advertisement is present in the vicinity. Thus, it is possible to perform large-volume advertisement transmission while reducing unnecessary power consumption.

Second Embodiment

The first embodiment describes an example in which the communication device 200 controls advertisement transmission based on SCAN_REQ reception processing. The second embodiment describes an example in which the communication device 200 controls advertisement transmission based on advertisement reception processing. Note that the following only describes features specific to the second embodiment in detail, and features that are the same as those of the first embodiment are omitted.

System Configuration

Figure 8:
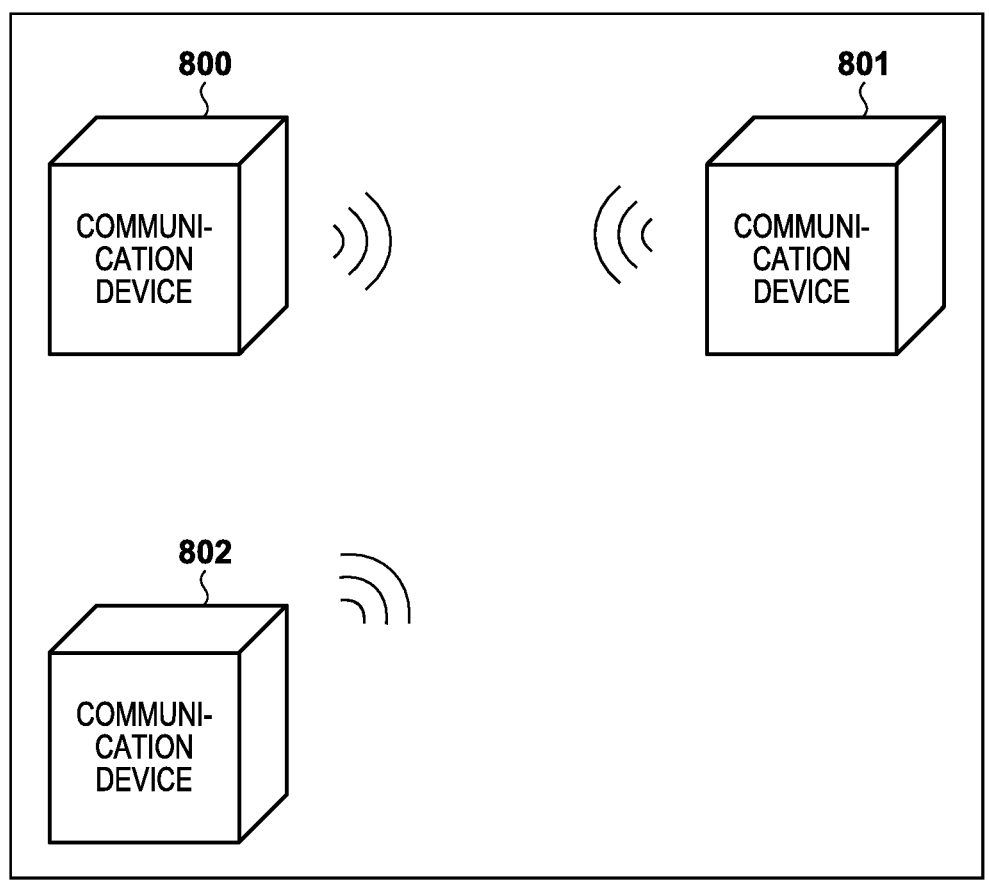
FIG. 8 is a diagram showing a system configuration according to a second embodiment.

FIG. 8 is a diagram showing a system configuration according to the second embodiment. As shown in the figure, the system according to the second embodiment includes a communication device 800, a communication device 801, and a communication device 802. The communication device 800, the communication device 801, and the communication device 802 are all provided with the internal configuration shown in FIG. 1.

The communication device 800 is a communication device that operates as a BLE advertiser and scanner, and embodies the features of the second embodiment. This communication device 800 can transmit and receive advertisement packets shown in FIGS. 3A and 3B.

The communication device 801 is a communication device that operates as a BLE scanner. This communication device 801 can transmit and receive advertisement packets shown in FIGS. 3A and 3B. It is possible to facilitate understanding by considering this communication device 801 as a communication device that corresponds to the communication device 201 according to the first embodiment.

The communication device 802 is a communication device that operates as an advertiser. This communication device 802 can transmit advertisement packets shown in FIGS. 3A and 3B. It is possible to facilitate understanding by considering this communication device 802 as a communication device that corresponds to the communication device 200 according to the first embodiment.

Sequence for Starting Large-Volume Advertisement Transmission

Next, an example of a sequence for starting large-volume advertisement transmission performed by the communication device 800 will be described with reference to FIG. 9.

Before starting this sequence, the communication device 800 has not started advertisement transmission.

In S901, the communication device 800 starts large-volume advertisement scanning. Here, scanning means to enter a state in which the communication device 800 can receive advertisement. The scanning may be started upon the communication device 800 being powered ON, or upon a user operation being performed using the operation unit 105 after the communication device 800 has been powered ON, for example.

In S902, the communication device 801 enters the BLE communication areas of the communication device 800 and the communication device 802. This step occurs if the user carries and moves one of the communication devices, a moving body such as an automobile equipped with the communication device travels, or the BLE communication function of the communication device 801 is enabled in the communication areas of the communication devices 800 and 802, for example.

In S903, the communication device 802 detects that a scanner is present in the BLE communication area thereof. According to the method for detection in this step, the communication device 802 may detect the presence of the communication device 801 by, after transmitting ADV_IND, receiving SCAN_REQ from the communication device 801 as a response to the ADV_IND, as shown in the first embodiment, for example.

In S904, the communication device 802 starts large-volume advertisement transmission upon detecting the presence of a scanner in the vicinity thereof.

In S905, the communication device 802 transmits ADV_EXT_IND. This ADV_EXT_IND is received by the communication device 800 and the communication device 801. In S906, the communication device 802 transmits AUX_ADV_IND. This AUX_ADV_IND is received by the communication device 800 and the communication device 801. In S907, the communication device 802 transmits AUX_CHAIN_IND. This AUX_CHAIN_IND is received by the communication device 800 and the communication device 801.

As shown in FIG. 3B, the large-volume advertisement transmission in S905 to S907 is repeatedly performed at predetermined time intervals.

In S908, upon receiving a large volume of advertisement in S905 to S907, the communication device 800 determines that a scanner that can receive a large volume of advertisement (the communication device 801 in this example) is present in the vicinity thereof, and starts large-volume advertisement transmission.

In S909, the communication device 800 transmits ADV_EXT_IND. This ADV_EXT_IND is received by the communication device 801. In S910, the communication device 800 transmits AUX_ADV_IND. This AUX_ADV_IND is received by the communication device 801. In S911, the communication device 800 transmits AUX_CHAIN_IND. This AUX_CHAIN_IND is received by the communication device 801.

Figure 9:
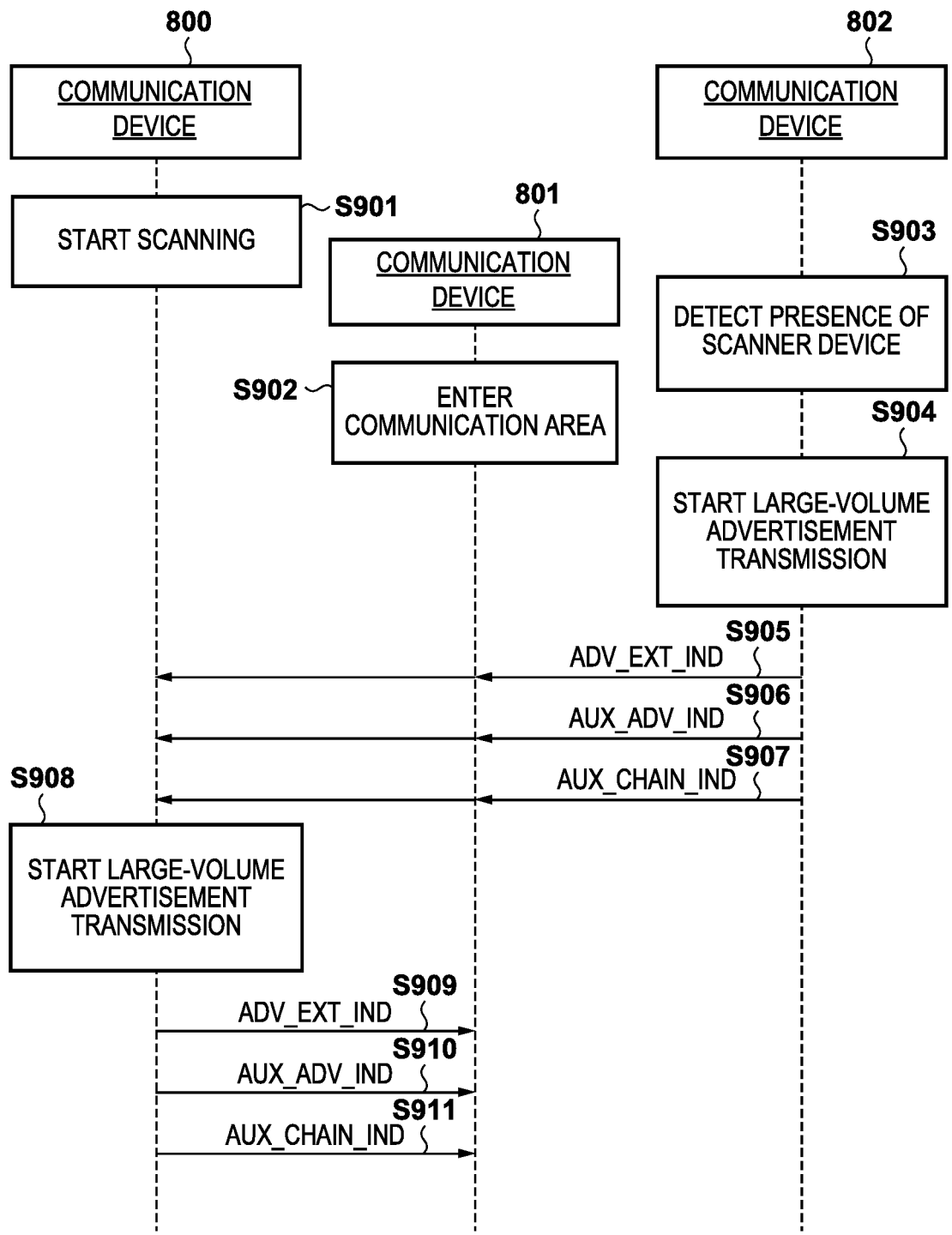
FIG. 9 is a diagram showing an example of a sequence for starting large-volume advertisement transmission according to the second embodiment.

This concludes a description with reference to FIG. 9 of an example of a sequence for starting large-volume advertisement transmission performed by the communication device 800.

Sequence for Stopping Large-Volume Advertisement Transmission

Next, an example of a sequence for stopping large-volume advertisement transmission performed by the communication device 800 will be described with reference to FIG. 10.

Before starting this sequence, the communication device 800 has been performing the sequence for starting large-volume advertisement transmission shown in FIG. 9, and has been repeating large-volume advertisement transmission and reception of a large volume of advertisement transmitted from the communication device 802.

In S1001, the communication device 802 transmits ADV_EXT_IND. This ADV_EXT_IND is received by the communication device 800 and the communication device 801. In S1002, the communication device 802 transmits AUX_ADV_IND. This AUX_ADV_IND is received by the communication device 800 and the communication device 801. In S1003, the communication device 802 transmits AUX_CHAIN_IND. This AUX_CHAIN_IND is received by the communication device 800 and the communication device 801.

In S1004, the communication device 800 transmits ADV_EXT_IND. This ADV_EXT_IND is received by the communication device 801. In S1005, the communication device 800 transmits AUX_ADV_IND. This AUX_ADV_IND is received by the communication device 801. In S1006, the communication device 800 transmits AUX_CHAIN_IND. This AUX_CHAIN_IND is received by the communication device 801.

In S1007, the communication device 801 exits from the BLE communication areas of the communication device 800 and the communication device 802. This step occurs if the user carries and moves one of the communication devices, a moving body such as an automobile equipped with the communication device travels, or the BLE communication function of the communication device 801 is disabled in the communication areas of the communication devices 800 and 802, for example.

In S1008, the communication device 802 detects the absence of the communication device 801 in the BLE communication area thereof. According to the method for detection in this step, the communication device 802 may detect the absence of the communication device 801 if the communication device 802, after transmitting ADV_IND, does not receive SCAN_REQ from the communication device 801 as a response to the ADV_IND, as shown in the first embodiment, for example.

In S1009, the communication device 802 stops large-volume advertisement transmission upon detecting the absence of a scanner in the vicinity thereof.

In S1010, as the communication device 800 has not received a large volume of advertisement for a predetermined period of time, the communication device 800 determines that there is no scanner that can receive a large volume of advertisement in the vicinity thereof, and stops large-volume advertisement transmission.

This concludes a description with reference to FIG. 10 of an example of a sequence for stopping large-volume advertisement transmission performed by the communication device 800.

Flow of Control of Large-volume Advertisement Transmission by Communication Device 800

Next, a flow of control of the large-volume advertisement transmission performed by the communication device 800 will be described with reference to FIG. 11.

Before this flowcharted is started, the communication device 800 has not been performing any kind of BLE communication.

In S1101, the control unit 101 of the communication device 800 starts advertisement scanning. Here, scanning means to enter a state in which the communication device 800 can receive advertisement. This step corresponds to S901. Also, the communication device 800 according to this second embodiment does not react when the received advertisement packet is ADV_IND.

In S1102, the control unit 101 of the communication device 800 determines whether or not advertisement has been received. The control unit 101 advances to S1103 upon receiving advertisement, and otherwise returns to S1102.

In S1103, the control unit 101 of the communication device 800 determines whether or not a device that receives a large volume of advertisement is present in the BLE communication area of the communication device 800. If the control unit 101 has determined in S1102 that a large volume of advertisement has been received, the control unit 101 determines that a device that receives a large volume of advertisement is present in the vicinity thereof. This large volume of advertisement corresponds to the packets in S905 to S907 shown in FIG. 9.

In S1104, if the result of determination indicates that a device that receives a large volume of advertisement is present in the BLE communication area of the communication device 800, the control unit 101 of the communication device 800 advances processing to S1105. On the other hand, if the result of determination indicates the absence of a large volume of advertisement, the control unit 101 of the communication device 800 returns processing to S1102.

In S1105, the control unit 101 of the communication device 800 starts large-volume advertisement transmission. This step corresponds to S908 in FIG. 9.

In S1106, the control unit 101 of the communication device 800 determines whether or not the reception of the advertisement that has been received at the predetermined intervals until then has been stopped. Upon determining that the reception has been stopped, the control unit 101 of the communication device 800 advances processing to S1107. Upon determining that the reception is continuing, the control unit 101 of the communication device 800 returns processing to S1106. Note that the advertisement in this step is the advertisement that has been being received since S1102.

In S1107, the control unit 101 of the communication device 800 stops large-volume advertisement transmission. This step corresponds to S1010 in FIG. 10.

As described above, according to the second embodiment, by controlling advertisement transmission based on advertisement reception processing, it is possible to perform large-volume advertisement transmission only when a device that receives the advertisement is present in the vicinity. Thus, it is possible to perform large-volume advertisement transmission while reducing unnecessary power consumption.

Note that the communication device 800 according to the second embodiment may also have the functions of the communication device 200 according to the first embodiment. For example, the communication device 800 transmits ADV_IND in predetermined cycles as in S502 in FIG. 5. Upon receiving SCAN_REQ in response to the ADV_IND, the communication device 800 performs processing according to the first embodiment. If the communication device 800 receives a large volume of advertisement packets through S905 to S907 shown in FIG. 9 irrelevant to the transmitted ADV_IND, the communication device 800 starts the processing in S908 and the subsequent steps in FIG. 9.

As described above, according to the first and second embodiments, it is possible to realize low power consumption in large-volume advertisement transmission by performing advertisement transmission control based on the content of processing performed to receive a request packet from an external device. Also, it is possible to avoid unnecessary interference in a BLE communication range by not transmitting unnecessary advertisement.

According to the present embodiment, when it is estimated that a device that can receive a large-sized advertisement is present within a communication area, it is possible to transmit advertisement packets of that size, thereby transmitting advertisement packets of a desired size with a low power consumption.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device comprising:
  a wireless communication interface for communicating with a device wirelessly;
  a processor; and
  a memory for storing a table including information specifying devices that can receive a second advertisement signal whose data size is larger than a first advertisement signal and instructions to be executed by the processor; wherein the instructions cause the processor to function as:
  a first transmission unit configured to broadcast the first advertisement signal, using a first frequency band, via the wireless communication interface without establishing communication with another device via the wireless communication interface;
  a determination unit configured to, when receiving, via the wireless communication interface, without establishing communication with another device via the wireless communication interface, a request signal that requests information regarding the communication device, in response to the first advertisement signal broadcasted by the first transmission unit, determine whether an external device capable of receiving the second advertisement signal is present within a communication area of the wireless communication interface by matching information included in the request signal with the table; and
  a second transmission unit configured to, if the determination unit determines that an external device capable of receiving the second advertisement signal is present within the communication area, broadcast, via the wireless communication interface, the second advertisement signal, using a second frequency band that is different from the first frequency band without establishing communication with another device via the wireless communication interface,
  wherein the first advertisement signal and the second advertisement signal are signals defined in Bluetooth®,
  wherein the second frequency band is used in communication of data packet after communication with another device is established.

2. The communication device according to claim 1, wherein
  the determination unit determines that an external device that can receive the second advertisement signal is present within a communication area if the determination unit receives the request signal within a predetermined period of time from the transmission of the first advertisement signal, and determines that an external device that can receive the second advertisement signal is not present in the communication area if the determination unit does not receive the request signal within the predetermined period of time.

3. The communication device according to claim 1, wherein
  the determination unit determines that an external device that can receive the second advertisement signal is present within a communication area if the table includes a device address matched with an address included in the request signal, and determines that an external device that can receive the second advertisement signal is not present in the communication area if the table does not include a device address matched with an address included in the request signal.

4. The communication device according to claim 1, wherein
  the determination unit determines that an external device that can receive the second advertisement signal is present within a communication area if reception sensitivity regarding the request signal is no less than a predetermined threshold value, and determines that an external device that can receive the second advertisement signal is not present in the communication area if the reception sensitivity is less than the threshold value.

5. The communication device according to claim 2, wherein
  even if the determination unit determines that an external device that can receive the second advertisement signal is present within a communication area, the second transmission unit does not broadcast the second advertisement signal if reception sensitivity regarding the received request signal is less than a predetermined threshold value.

6. The communication device according to claim 1, wherein
the first transmission unit transmits an advertisement signal using primary advertising channels defined in Bluetooth®, and
the second transmission unit transmits an advertisement signal using secondary advertising channels defined in Bluetooth®.

7. The communication device according to claim 1, wherein the instructions cause the processor to function as:
a reception unit configured to receive an advertisement signal defined in Bluetooth®; and
a second determination unit configured to determine whether or not an external device that can receive the second advertisement signal is present in the communication area of the wireless communication interface by determining whether or not the advertisement signal received by the reception unit has data size of the second advertisement signal,
wherein the second transmission unit broadcasts the second advertisement signal if the result of determination by the second determination unit indicates the presence of the external device.

8. The communication device according to claim 1, wherein
the first transmission unit broadcasts the first advertisement signal at regular intervals even after the second transmission unit starts broadcasting the second advertisement signal.

9. The communication device according to claim 8, wherein
the second transmission unit stops broadcasting the second advertisement signal if the second transmission unit does not receive a request signal in response to a first advertisement signal broadcast after the second transmission unit starts broadcasting the second advertisement signal.

10. The communication device according to claim 8, wherein
if the second transmission unit receives a request signal in response to a first advertisement signal broadcast after the second transmission unit starts broadcasting the second advertisement signal, the second transmission unit stops broadcasting the second advertisement signal upon the determination unit determining that an external device that can receive the second advertisement signal is not present in the communication area, based on the request signal.

11. The communication device according to claim 8, wherein the second transmission unit is further configured to, while the first transmission unit broadcasts the first advertisement signal at regular intervals using the first frequency band, limit transmission of the second advertisement signal using the second frequency band based on a determination by the determination unit of whether (i) information included in the request signal sent in response to the first advertisement signal matches with information in the table and (ii) the external device remains in the communication area.

12. The communication device according to claim 1, wherein if the determination unit determines that no external device capable of receiving the second advertisement signal is present within the communication area, the second transmission unit does not broadcast the second advertisement signal.

13. A method for controlling a communication device having a wireless communication interface, the method comprising:
(a) broadcasting a first advertisement signal, using a first frequency band, via the wireless communication interface without establishing communication with another device via the wireless communication interface;
(b) when receiving, via the wireless communication interface, without establishing with communication with another device via the wireless communication interface, a request signal that requests information regarding the communication device, in response to the first advertisement signal broadcasted in the broadcasting (a), determining whether an external device capable of receiving a second advertisement signal whose data size is larger than the first advertisement signal is present within a communication area of the wireless communication interface by matching information included in the request signal with a table stored in a memory, where the table includes information specifying devices that can receive the second advertisement signal; and
(c) if it is determined in the determining (b) that an external device capable of receiving the second advertisement signal is present in the communication area, broadcasting the second advertisement signal, using a second frequency band that is different from the first frequency band without establishing communication with another device via the wireless communication interface,
wherein the first advertisement signal and the second advertisement signal are signals defined in Bluetooth®,
wherein the second frequency band is used in communication of data packet after communication with another device is established.

14. A non-transitory computer-readable storage medium storing a program which, when read and executed by a computer of a communication device, causes the communication device having a wireless communication interface to execute steps of a method for controlling the communication device, the method comprising:
(a) broadcasting a first advertisement signal, using a first frequency band via the wireless communication interface without establishing communication with another device via the wireless communication interface;
(b) when receiving, via the wireless communication interface, without establishing communication with another device via the wireless communication interface, a request signal that requests information regarding the communication device, in response to the first advertisement signal broadcasted in the broadcasting (a), determining whether an external device capable of receiving a second advertisement signal whose data size is larger than the first advertisement signal is present within a communication area of the wireless communication interface by matching information included in the request signal with a table stored in a memory, where the table includes information specifying devices that can receive the second advertisement signal; and
(c) if it is determined in the determining (b) that an external device capable of receiving the second advertisement signal is present in the communication area, broadcasting the second advertisement signal, using a second frequency band that is different from the first frequency band without establishing communication with another device via the wireless communication interface, wherein the first advertisement signal and the second advertisement signal are signals defined in Bluetooth®, wherein the second frequency band is used in communication of data packet after communication with another device is established.

* * * * *